United States Patent [19]

Muraoka et al.

[11] Patent Number: 5,077,003
[45] Date of Patent: Dec. 31, 1991

[54] ROLLING-PART STEEL AND ROLLING PART EMPLOYING SAME

[75] Inventors: Tomoki Muraoka, Fujisawa; Kiyoshi Hirakawa, Hiratsuka, both of Japan

[73] Assignee: Nippon Seiko Kabushiki Kaisha, Tokyo, Japan

[21] Appl. No.: 430,876

[22] Filed: Nov. 2, 1989

[30] Foreign Application Priority Data

Nov. 4, 1988 [JP] Japan .................. 63-278992
Feb. 9, 1989 [JP] Japan .................... 1-30749

[51] Int. Cl.$^5$ .............................. C22C 38.18
[52] U.S. Cl. ................... 420/104; 420/105; 420/109; 420/110; 148/906; 148/333; 148/334; 384/492; 384/912
[58] Field of Search ............ 384/492, 548, 912, 625; 148/906, 333, 334; 420/104, 105, 106, 109, 110

[56] References Cited

U.S. PATENT DOCUMENTS

| | | | |
|---|---|---|---|
| 3,117,041 | 1/1964 | Koistinen | 148/165 |
| 3,275,389 | 9/1966 | Neilson et al. | 384/95 |
| 4,023,988 | 5/1977 | Stickels et al. | 148/12.4 |
| 4,026,727 | 5/1977 | Finkl et al. | 148/2 |
| 4,191,599 | 3/1980 | Stickels et al. | 148/16.5 |
| 4,642,219 | 2/1987 | Takata et al. | 420/104 |
| 4,696,581 | 9/1987 | Tsushima et al. | 384/565 |
| 4,930,909 | 12/1990 | Murakami et al. | 384/912 |

FOREIGN PATENT DOCUMENTS

| | | | |
|---|---|---|---|
| 889248 | 12/1971 | Canada | 420/104 |
| 5233821 | 3/1977 | Japan | 148/333 |
| 6021359 | 2/1985 | Japan | 420/104 |
| 61-257452 | 11/1986 | Japan . | |
| 63-172030 | 7/1988 | Japan . | |
| 857308 | 12/1960 | United Kingdom . | |
| 977138 | 12/1964 | United Kingdom . | |
| 1174414 | 12/1969 | United Kingdom . | |
| 2187202 | 9/1987 | United Kingdom . | |

Primary Examiner—Deborah Yee
Attorney, Agent, or Firm—Basile and Hanlon

[57] ABSTRACT

A rolling-part steel and a rolling part employing same are disclosed. The steel includes: C; 0.1 to 0.7 wt. %, Si; below or equal to 0.04 wt. %; Mn; below or equal to 1.0 wt. %, Cr; 0.2 to 1.0 wt. %, S; below or equal to 0.003 wt. %; P; below or equal to 0.025 wt. %, O; below or equal to 0.0015 wt. %, the reminder Fe, and a necessary impurity. The steel has a good plastic-workability such that the rolling part can be produced only by plastic working. The steel also has a good hardenability.

51 Claims, 1 Drawing Sheet

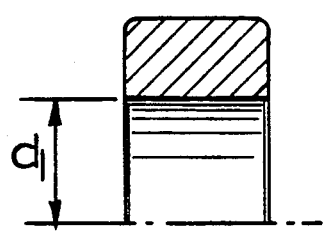 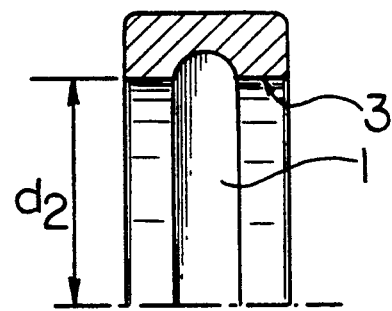
FIG-1A  FIG-1B
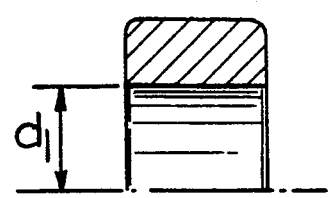 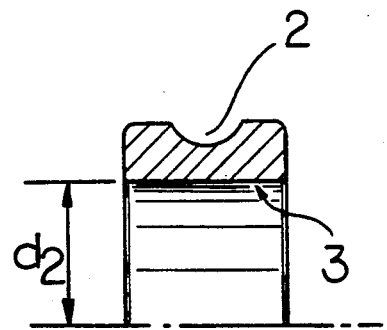
FIG-1C  FIG-1D

ROLLING-PART STEEL AND ROLLING PART EMPLOYING SAME

BACKGROUND OF THE INVENTION

1. Field of the Invention

The present invention relates to a rolling-part steel for a rolling part, e.g., a rolling bearing used with automotive vehicles, agricultural machinery, construction machines and machines relating to an iron and steel industry. The present invention relates more particularly to rolling parts made of the rolling-part steel.

2. Description of the Related Art

Heretofore, when the inner and outer races of a rolling bearing, e.g., a ball bearing or spherical bearing, have been made of bearing steer (e.g., JIS, SUJ-2), a tubular blank has been cold worked into the inner or outer race by cold rolling so that the inner or outer race require no lathe turning after the cold rolling. Then the inner or outer race has been carburized-and-quenched or through-quenched.

However, it is known that a microcrack may be produced in the inner cylindrical surface layer of each of the inner and outer races of the rolling bearing which causes a crack in cold rolling or plastic working.

Thus, the present inventors have provided a rolling bearing which prevents the occurrence of the microcrack in plastic working, e.g., cold rolling or upsetting (see Japanese patent application No. 63-172030).

Japanese unexamined patent publication No. 61-257452 discloses another prior-art cold-rolled low carbon steel of a good delayed fracture characteristic having a low deformation resistance and an increased deformability both provided by means of reducing P (phosphorus) and Mn (manganese) and including Cr (chromium).

However, the prior-art bearing steel entails a problem in that the deformability in cold working of the prior-art bearing steel is low and the deformation resistance in cold working thereof is high i.e., the plastic workability of the prior art bearing steel is insufficient even when the prior-art bearing steel is spheroidized.

When the deformability in plastic working of the bearing steel is low, a working ratio of the bearing steel is low, so that a low-deformable portion of the bearing steel experiences the microcrack which in turn propagates to the crack. The occurrence of this crack causes a ring fracture of each of the inner and outer races of the rolling bearing. Thus, the surface of each of the inner and outer races of the rolling bearing has previously provided a 0.4–0.7 mm excessive thickness thereon, so that the excessive thickness which experienced the crack has been eliminated by machining after plastic working.

On the other hand, if the need for the provision of and the following elimination of such excessive thickness would be eliminated, each of the inner and outer races had to be subjected to a plastic working of a somewhat reduced degree and then to an additional lathe turning machining operation into a finished shape.

In addition, when the deformation resistance in plastic working of the bearing steel is high, a great shaping load (i.e., pressure) is required, so that a tool used in the plastic working of the bearing steel, e.g., a mandrel used in cold rolling, has been damaged early which reduced its service life. Also, the plastic working rate cannot be increased, so that the shaping time of the plastic working in long.

The present inventors have discovered that an improvement of the hardenability of a rolling-part steel and a refining of crystal grains thereof are important in order to secure a necessary rolling contact fatigue life (hereinafter, referred to as a service life or rolling life) of the rolling part.

SUMMARY OF THE INVENTION

A primary object of the present invention is to provide a rolling-part steel of a good plastic workability and good hardenability.

Another object of the present invention is to provide a rolling-part steel which is effectively subjected to a refining of crystal grains thereof.

A further object of the present invention is to provide a long-life and low-cost rolling part and in particular, a long-life and low-cost rolling bearing by use of the subject rolling-part steels.

In order to achieve the primary object, an inventive rolling-part steel consists essentially of C (carbon); 0.1 to 0.7 wt. %, Si (silicon); below or equal to 0.04 wt. %, Mn (manganese); below or equal to 1.0 wt. %, Cr (chromium); 0.2 to 1.0 wt. %, S (sulfur); below or equal to 0.003 wt. %, P (phosphorus); below or equal to 0.025 wt. %, O (oxygen); below or equal to 0.0015 wt. %, the reminder Fe (iron), and a necessary impurity.

The feature of another embodiment is that the contens of C, Mn and Cr of the rolling-part steel are as follows: C; 0.4 to 0.7 wt. %, Mn; 0.4 to 1.0 wt. %, and Cr; 0.4 to 1.0 wt. %.

The feature of another embodiment is that the rolling-part steel further includes Mo (molybdenum); below or equal to 0.8 wt. %.

The feature of yet another embodiment is that the rolling-part steel of claim 1 further includes: Mo; below or equal to 0.5 wt. %, B (boron); 0.0005 to 0.003 wt. %, Ti (titanium); below or equal to 0.05 wt. % and N (nitrogen); below or equal to 0.005 wt. %.

The feature of another embodiment is that the content of Mn of the rolling-part steel of each of the two preceding embodiments is below or equal to 0.25 wt. %.

The feature of another embodiment is that the content of P of the rolling-part steel of the last above-described embodiment is below or equal to 0.01 wt. %.

The feature of a final embodiment is that the content of at least one of the Nb (niobium) and V (vanadium) of the rolling part steel of each of preceding embodiments further includes no more than 0.2 wt. % of at least one element selected from the group of Nb and V.

The invention also comprises a rolling part, wherein the rolling-part steel of certain of the steels described above is plastically worked into a predetermined shape.

The invention also comprises a rolling part in which the rolling-part steel of any of the embodiments described above is worked into a predetermined shape and then subjected to hardening-heat treatment.

Further, at least one of the inner and outer races and the rolling element of a rolling gearing is made of any of the rolling-part steel described above which is plastically worked.

Another feature of this latter embodiment is that the rolling bearing is subjected to hardening-heat treatment.

Also, a rolling part formed of the final embodiment of the rolling-part steel is plastically worked into a predetermined shape and then subjected to hardening-heat treatment.

Finally, another feature is that at least one of the inner and outer races and the rolling element of a rolling bearing is made of the final embodiment of the rolling-part steel which is plastically worked and then subjected to hardening-heat treatment.

BRIEF DESCRIPTION OF THE DRAWINGS

FIG. 1A is a sectional view of a half of an annular blank for the outer race of a rolling bearing prior to cold rolling;

FIG. 1B is a sectional view of a half of the outer race of FIG. 1(1) after cold rolling;

FIG. 1C is a sectional view of a half of an annular blank for the inner race of the rolling bearing of FIG. 1(1) prior to cold rolling; and FIG. 1D is a sectional view of a half of the inner race of FIG. 1(3) after cold rolling.

DETAILED DESCRIPTION OF THE INVENTION

The present invention reduced the contents of O and S of the rolling-part steel which form an inclusion reducing the deformability in the plastic working of the rolling-part steel and reduced the contents of Mn and Si of the rolling-part steel which increased the deformation resistance in the plastic working of the rolling-part steel. The present invention also compensated for a reduction in the hardenability of the rolling-part steel due to a reduction in the contents of Mn and Si of the rolling-part steel by means of adding Cr, Mo and B to the rolling-part steel, and refined the crystal grains of the rolling-part steel be means of adding at least one of Nb and V to the rolling-part steel.

Hereinafter, the operations of the contained elements and the critical significances of the contents thereof will be described.

C (carbon); 0.1 to 0.7 wt. %

When the content of C was below 0.1 wt. % the period of time required for carburizing-or carbonitriding-heat treatment increased so much as to reduce the productivity of the heat treatment. On the other hand, when the content of C was above 0.7 wt. %, the deformation resistance in plastic working of the rolling-part steel is increased so much as to reduce the plastic workability thereof. Thus, the content of C was selected in the captioned range. In particular, the content of C is preferably in the range of 0.4 to 0.7 wt. %.

Si (silicon); below or equal to 0.04 wt. %

Si is required as a deoxidizer in steel-making and for improving the hardenability of the rolling-part steel. When the content of Si was above 0.04 wt. %, the deformation resistance in a high-degreed plastic-working of the rolling-part steel was significantly increased. Thus, the content of Si was selected in the captioned range.

Mn (manganese); below or equal to 1.0 wt. %

Mn increases the deformation resistance in plastic working of the rolling-part steel so as to reduce the plastic workability thereof and is chemically bonded with S (sulfur) constituting an impurity to form MnS which causes a crack in the rolling-part steel. Thus, the upper limit of the content of Mn was 1.0 wt. % as captioned above.

The present invention compensated for a reduction in the hardenability of the rolling-part steel due to reductions in the contents of Si and Mn by means of adding at least one or two of Cr, Mo and B to the rolling-part steel.

When the rolling-part steel lacks Mo, the lower limit of the content of Mn preferably is 0.4 wt. % since an increasing rate of the hardenability of the rolling-part steel lacking Mo is considered lower than that of the hardenability of the rolling-part steel with Mo.

On the other hand, when the rolling-part steel contains Mo, the upper limit of the content of Mn preferably is 0.25 wt. % since the content of Mn preferably is as low as possible.

Cr (chromium); 0.2 to 1.0 wt. %

Cr is required to compensate for a reduction in the hardenability of the rolling-part steel due to low contents of Si and Mn or to increase the hardenability and improve the abrasion resistance of the rolling-part steel. When the content of Cr was below 0.2 wt. %, the hardenability and abrasion resistance of the rolling part were insufficient. On the other hand, when the content of Cr was above 1.0 wt. %, a chromium carbide is so much produced in the rolling-part steel as to reduce the service life of the rolling part made of the rolling-part steel. Thus, the content of Cr was selected in the captioned range.

When the rolling-part steel lacks Mo, the lower limit of the content of Cr preferably is 0.4 wt. % since the increasing rate of the hardenability of the rolling-part steel lacking Mo is considered lower than that of the hardenability of the rolling-part steel with Mo.

Mo (molybdenum); below or equal to 0.8 or 0.5 wt. %

Mo was effective like Cr to compensate for the reduction in the hardenability of the rolling-part steel due to low contents of Si and Mn or to increase the hardenability of the rolling-part steel. The upper limit of the content of Mo of the rolling-part steel lacking B was 0.8 wt. % since the content of Mo which is above 0.8 wt. % failed to produce a significant difference in improving the hardenability of the rolling-part steel.

The present invention provides a case in which B is added to the rolling-part steel together with Mo in order to compensate for the reduction in the hardenability of the rolling-part steel due to low contents of Si and Mn. In this case, when the rolling-part steel contains B, the upper limit of the content of Mo of the rolling-part steel with B was 0.5 wt. % since the content of Mo which is above 0.5 wt. % failed to produce a significant difference in improving the hardenability of the rolling-part steel.

B (boron); 0.0005 to 0.003 wt. %

Since B was effective to compensate for the reduction in the hardenability of the rolling-part steel due to low contents of Si and Mn, the lower limit of the content of B was 0.0005 wt. %.

On the other hand, since the content of B which is above 0.003 wt. % causes B to precipitate in grain boundaries and thereby cause a grain boundary embrittlement, the upper limit of the content of B was 0.003 wt. %.

Ti (titanium); below or equal to 0.05 wt. %

Ti is required to fix N constituting an impurity as TiN. N acts on B to form BN thereby to block B from improving the hardenability of the rolling-part steel. Thus, Ti was added to a rolling-part steel containing B in order to fix N and to secure a necessary hardenability of the rolling-part steel containing B. Ti also produced TiN refining the crystal grains of the rolling-part steel and increased the service life of the rolling part.

However, the content of Ti was 0.05 wt. % at highest. When the content of Ti was above 0.05 wt. %, a titanium carbide was produced in the rolling-part steel. Since the titanium carbide causes a reduction in the tenacity of the rolling-part steel, the upper limit of the content of Ti was selected to be 0.05 wt. % as captioned above.

N (nitrogen); below or equal to 0.005 wt. %

N constitutes an impurity contained in the rolling-part steel, so that the content of N must be as much reduced as possible. N acts on B to produce BN which blocks B from improving the hardenability of the rolling-part steel.

In addition, since TiN produced by an addition of Ti to the rolling-part steel reduced the service life of the rolling part, caused the significant age-hardening in plastic working of the rolling-part steel due to an increase in temperature and increased the deformation resistance in plastic working of the rolling-part steel, the upper limit of the content of N is selected to be 0.005 wt. % as captioned above.

P (phosphorus); below or equal to 0.025 wt. %

P constitutes an impurity contained in the rolling-part steel as N does, so that the content of P must be as much reduced as possible. Since P caused the significant age-hardening in plastic working of the rolling-part steel due to an increase in the temperature and so much increased the deformation resistance in plastic working of the rolling-part steel as to reduce the plastic workability of the rolling-part steel, the upper limit of the content of P is selected to be 0.025 wt. % as captioned above.

S (sulfur); below or equal to 0.003 wt. %

S constitutes an impurity causing a sulfide-system nonmetallic inclusion, e.g., MnS, to form. MnS has such a low hardness as to reduce the deformability of the rolling-part steel and causes the crack in plastic working, e.g., cold rolling. The content of S had to be reduced so as to prevent the occurrence of the crack in the plastic working of the rolling part and allow a stronger plastic working thereof. Thus, the upper limit of the content of S was selected to be 0.003 wt. % as captioned above.

O (oxygen); below or equal to 0.0015 wt. %

Since O causes an oxide-system nonmetallic inclusion to form which reduces the deformability in plastic working of the rolling-part steel and the service life of the rolling part made of the rolling-part steel, the content of O must be reduced as much as possible. Thus, the upper limit of the content of O was selected to be 0.0015 wt. %.

Nb (niobium) or V (vanadium); below or equal to 0.2 wt. %

Each of Nb and V was effective to precipitate in the grain boundaries of the rolling-part steel, suppress the crystal grain from growing coarsely and refine the crystal grains of the rolling-part steel so that the service life of the rolling part made of the rolling-part steel was increased. Generally, when a high-temperature heat treatment (at a temperature of 950° C. to 970° C.) is carried out on the rolling part in order to reduce a period of time for hardening-heat treatment, e.g., carburizing or carbonitriding, the crystal grains of the rolling part steel tent to grow coarsely. However, even in this case, each of Nb and V was effective to prevent the crystal grains of the rolling-part steel from growing coarsely. Therefore, the rolling-part steel contained no more than 0.2 wt. % of at least one of Nb and V. When the content of at least one of Nb and V was above 0.2 wt. %, the operation of the at least one of Nb and V in refining the crystal grains of the rolling-part steel was less improved and the cost increased, so that the content of the at least one of Nb and V was selected in the captioned range. In particular, the content of Nb preferably is 0.03 to 0.2 wt. % and the content of V preferably is 0.1 to 0.2 wt. %.

The present invention provides the rolling-part steel of a good plastic workability and good hardenability which reduced the contents of Si, Mn and P to increase the deformation resistance in plastic working of the rolling-part steel and reduced the contents of S and O to reduce the deformability in plastic working of the rolling-part steel, and compensated for the reduction in the hardenability of the rolling-part steel due to the reduced contents of Si and Mn by means of adding one or two of Cr, Mo and B to the rolling-part steel.

The present invention also provides the rolling-part steel which refined the crystal grains thereof by means of adding at least one of Nb and V to the rolling-part steel.

When the rolling-part steels were subjected to plastic working to produce the rolling part, the rolling part experienced no cracks and allowed a plastic working of a high degree since the plastic workability of the rolling-part steel was good. Thus, the present invention provides a longer-life rolling part and, especially, a rolling bearing.

In addition, since the plastic workability of each of the rolling-part steels was good, the service life of a tool for plastic working was increased, the shaping time was reduced in response to an increased working rate, and lathe turning after plastic working was eliminated. In addition, since each of the rolling-part steels was plastically worked into a finished shape, the yield of material of each of the rolling-part steels was increased. Thus, the present invention provides a low-cost rolling part and, especially, a rolling bearing.

When the rolling-part steel which had been plastically worked was subjected to hardening-heat treatment, the rolling part which had been singularly plastically worked but not subjected to surface hardening heat treatment received a higher surface hardness since the hardenability of this rolling-part steel was good. Thus, the present invention provides a longer-life and a lower-cost rolling part and, especially, a rolling bearing.

In addition, when the rolling-part steel with at least one of Nb and V was employed, the crystal grains of this rolling-part steel were refined even after hardening-heat treatment. Thus, the present invention provides a longer-life rolling part and, especially, a rolling bearing.

As described above, the present invention provides a rolling-part steel of a good plastic workability and a good hardenability and also a rolling-part steel refining the crystal grains thereof. The present invention also provides a long-life and low-cost rolling part and, especially, a rolling bearing.

DESCRIPTION OF THE PREFERRED EMBODIMENTS

Hereinafter, the preferred embodiments of the present invention will be described. The inventive steels (A1 to A15) and control steels (B1 to B8) each having the compositions as shown in Tables 1-A and 1-B were derived from ingots produced by a 100 kgf-vacuum fusion furnace and subjected to a one-hour spheroidizing. Each of the steels as shown in Tables 1-A and 1-B was forged into a shape with a 50ϕ-diameter and then subjected to lathe turning so as to provide a blank with a predetermined shape. The resulting blank was shaped into the inner or outer race of a single-row and deep grooved ball bearing by a cold gear rolling in which the major diameter of the inner or outer race did not be restrained.

FIGS. 1A to 1D are axial sections through halves of annular blanks for and halves of the inner and outer races of the rolling bearing. FIG. 1A is a sectional view of a half of an annular blank for the outer race of the rolling bearing prior to cold rolling. FIG. 1B is a sectional view of a half of the outer race shown in FIG. 1A after cold rolling. In FIG. 1A, the bore radius of the annular blank for the outer race prior to cold rolling is indicated at $d_1$. In FIG. 1B, the minor bore radius of the outer race after cold rolling is indicated at $d_2$ and a deep groove defined in the outer race by cold rolling is indicated by reference numeral 1.

FIG. 1C is a sectional view of a half of an annular blank for the inner race of the rolling bearing of FIG. 1A prior to cold rolling. FIG. 1D is a sectional view of a half of the inner race shown in FIG. 1C after cold rolling. In FIG. 1C, the bore radius of the inner race after cold rolling is indicated at $d_2$ and a groove defined in the inner race by cold rolling is indicated by reference numeral 2.

As is apparent from FIGS. 1A to 1D, the ratio ($d_2/d_1$) of the bore radius ($d_2$) of a shaped product after cold rolling to the bore radius ($d_1$) of a blank for the inner or outer race prior to cold rolling is defined as a rolling ratio. As the rolling ratio increases, working strength of cold rolling increases.

at 3 in FIGS. 1B and 1D mainly experiences such crack.

TABLE 2

|  |  | (1) | | (2) | |
|---|---|---|---|---|---|
|  |  | Outer race | Inner race | Outer race | Inner race |
| Inventive Steels | A1 | none | none | none | none |
|  | A2 | " | " | " | " |
|  | A3 | " | " | " | " |
|  | A4 | " | " | " | " |
|  | A5 | " | " | " | " |
|  | A6 | " | " | " | " |
|  | A7 | " | " | " | " |
|  | A8 | " | " | " | " |
| Control Steels | B1 | none | none | present | present |
|  | B2 | present | " | " | " |
|  | B3 | " | present | " | " |
|  | B4 | " | " | " | " |

In Table 2, the rolling ratio ($d_2/d_1$) of the case (1) is about 1.45 and the rolling ratio ($d_2/d_1$) of the case (2) is about 1.6.

The following facts are apparent from Table 2.

The plastic workability or each of the control steels B1 and B2 of which the content of Si is out of the inventive rages is low so that both the inner and outer races made of each of the control steels B1 and B2 experience a crack when the working strength of cold gear rolling is high (i.e., the rolling ratio is about 1.6).

The deformation resistance of the control steel B3 of which the contents of C, Si and Cr are out of the inven-

TABLE 1-A

|  |  | C | Si | Mn | P | S | Cu | Ni | Cr | Mo | Nb or V | O*1 |
|---|---|---|---|---|---|---|---|---|---|---|---|---|
| Inventive Steels | A1 | 0.42 | <0.01 | 0.47 | 0.011 | 0.001 | 0.01 | 0.01 | 0.70 | <0.01 | Tr | 11 |
|  | A2 | 0.41 | 0.01 | 0.45 | 0.010 | <0.001 | 0.01 | 0.01 | 0.80 | " | (0.08) | 9 |
|  | A3 | 0.42 | 0.01 | 0.44 | 0.010 | 0.002 | 0.01 | 0.01 | 0.82 | " | <0.10> | 8 |
|  | A4 | 0.55 | <0.01 | 0.44 | 0.009 | 0.003 | 0.01 | <0.01 | 0.82 | " | · Tr | 9 |
|  | A5 | 0.56 | 0.02 | 0.46 | 0.010 | 0.002 | <0.01 | <0.01 | 0.74 | " | " | 12 |
|  | A6 | 0.64 | <0.01 | 0.45 | 0.009 | 0.002 | 0.01 | 0.01 | 0.77 | " | " | 9 |
|  | A7 | 0.68 | 0.04 | 0.46 | 0.010 | 0.001 | <0.01 | 0.02 | 0.82 | " | " | 8 |
|  | A8 | 0.65 | 0.01 | 0.45 | 0.011 | 0.003 | 0.01 | 0.01 | 0.76 | " | <0.09> | 9 |
| Control Steels | B1 | 0.41 | 0.25 | 0.44 | 0.011 | 0.002 | 0.01 | <0.01 | 0.80 | " | Tr | 10 |
|  | B2 | 0.66 | 0.27 | 0.47 | 0.010 | 0.001 | 0.01 | <0.01 | 0.78 | " | " | 8 |
|  | B3 | 1.03 | 0.24 | 0.45 | 0.008 | <0.001 | <0.01 | <0.01 | 1.43 | " | " | 8 |
|  | B4 | 0.55 | <0.01 | 0.44 | 0.009 | 0.005 | 0.01 | <0.01 | 0.82 | " | " | 9 |

*1 The content of O is expressed in terms of ppm and the contents of the other elements are expressed in terms of wt. %. (also applicable to the contents of the elements as shown in Table 1-B)
The numeral enclosed by a pair of arc-shaped parentheses ( ) indicates the content of Nb.
A numeral enclosed by a pair of acute parentheses < > indicates the content of V.
Tr indicates that the content of Nb or V is in munite quantity.

TABLE 1-B

|  |  | C | Si | Mn | P | S | Cr | Mo | B | Ti | N | O*1 |
|---|---|---|---|---|---|---|---|---|---|---|---|---|
| Inventive Steels | A9 | 0.21 | 0.01 | 0.21 | 0.010 | 0.001 | 0.85 | 0.60 | | | | 10 |
|  | A10 | 0.20 | 0.01 | 0.20 | 0.010 | 0.002 | 0.82 | 0.30 | 0.0015 | ≦0.05 | ≦0.005 | 9 |
|  | A11 | 0.42 | 0.01 | 0.22 | 0.010 | 0.001 | 0.80 | 0.38 | | | | 8 |
|  | A12 | 0.41 | 0.01 | 0.18 | 0.010 | 0.001 | 0.80 | 0.40 | 0.0010 | ≦0.05 | ≦0.005 | 11 |
|  | A13 | 0.64 | 0.01 | 0.20 | 0.008 | 0.001 | 0.60 | 0.35 | | | | 12 |
|  | A14 | 0.68 | 0.01 | 0.21 | 0.010 | 0.001 | 0.85 | 0.21 | 0.0013 | ≦0.05 | ≦0.005 | 9 |
|  | A15 | 0.65 | 0.01 | 0.20 | 0.009 | 0.001 | 0.20 | 0.65 | | | | 10 |
| Control Steels | B5 | 0.22 | 0.28 | 0.21 | 0.010 | 0.001 | 0.82 | ≦0.1 | | | | 9 |
|  | B6 | 0.40 | 0.25 | 0.48 | 0.012 | 0.001 | 0.80 | 0.35 | | | | 10 |
|  | B7 | 1.03 | 0.23 | 0.45 | 0.008 | 0.001 | 1.42 | — | | | | 8 |
|  | B8 | 0.66 | 0.01 | 0.37 | 0.011 | 0.001 | 0.85 | 0.20 | 0.0011 | ≦0.05 | ≦0.005 | 8 |

Annular blanks each made of the steels of the Tables 1-A and 1-B were plastically worked into the inner and outer races of the rolling bearing with the rolling ratio changed. Then, the presence or absence of a crack in the inner and outer races was examined with the naked eye. The following Table 2 shows the results of this examination. It is well known that the inner cylindrical surface of each of the inner and outer races as indicated tive ranges is high so that both the inner and outer races made of the control steel B3 experience a crack both when the working strength of cold rolling is low (i.e., the rolling ratio is about 1.45) or high.

The control steel B4 of which the content of S is out of the inventive range has much a sulfide-system nonmetallic inclusion so that both the inner and outer races made of the control steel B4 experience a crack both when the working strength of cold rolling is low and when it is high.

On the other hand, the inner and outer races made of each of the inventive steels A1 to A8 experience no crack both when the working strength of cold rolling is low and when it is high.

Since the plastic workability of each of the inventive steels A1 to A8 of Table 2 is good and the inner and outer races made of each of the inventive steels A1 to A8 experience no crack when the rolling ratio is, e.g., in the range of 1.45 to 1.6 even when the annular blank made of each of the inventive steels A1 to A8 for each of the inner and outer races is plastically worked into a finished shape by cold rolling, a need for the prior-art step of providing the annular blank with an excessive thickness after cold rolling was eliminated and the process for manufacturing the rolling bearing was simplified. Thus, the yield of material was improved and manufacturing cost was reduced.

The shaping pressure and time of the cold rolling and the service life of a mandrel were measured when each of the inventive steels A9 to A15 and the control steels B5 to B8 of Table 1-B was subjected to cold rolling so as to produce the inner and outer races of the single-row ball bearing. Table 3 shows the results of these measurements.

In this case, the rolling ratio of each of the inventive steels A9 to A15 and the control steels B5 to B8 of Table 3 was selected to be 1.6.

mation resistance in plastic working of that steel, was good, so that the plastic working of that steel was carried out for a short period of time by a low shaping load. Therefore, the mandrel life and the productivity in the manufacture of the inner and outer races were increased. Thus, the rolling part made of each of the inventive steels A9 to A15 provided a high productivity and a manufacturing low cost.

In addition, since the shaping load placed on each of the inventive steels A9 to A15 was small, the cold gear rollings of the inner and outer races each with smaller bore diameters were carried out.

The presence or absence of the crack in the inner cylindrical surface (indicated by reference numeral 3 in FIGS. 1B and 1D) of each of the inner and outer races made of each of the inventive steels A9 to A15 was examined with the naked eye. Neither the inner cylindrical surface of the inner race nor the inner cylindrical surface of the outer race was found to experience the crack. This is because the contents of O and S causing a reduction in the deformability in plastic working of each of the inventive steels A9 to A15 are low. Therefore, each of the inventive steels A9 to A15 was subjected to a high-degreed plastic working (i.e., a high-degreed plastic working of the 1.6 rolling ratio) and the service life of the rolling part made of each of the inventive steels A9 to A15 was increased. In addition, since the working strength of the plastic working of each of the inventive steels A9 to A15 was high, that steel was plastically worked into a finished shape without a need for lathe turning following the plastic working, so that

TABLE 3

|  |  | Inner race | | | Outer race | | |
|---|---|---|---|---|---|---|---|
|  |  | Shaping load | Shaping time | Mandrel life | Shaping load | Shaping time | Mandrel life |
| Inventive Steels | A9 | 3.4 ton | 7.2 sec | 80,000 pieces | 5.7 ton | 8.5 sec | 57,000 pieces |
|  | A10 | 3.2 | 7.0 | 83,000 | 5.2 | 8.3 | 60,000 |
|  | A11 | 4.0 | 7.8 | 65,000 | 6.8 | 9.2 | 52,000 |
|  | A12 | 3.8 | 7.6 | 68,000 | 6.5 | 9.1 | 55,000 |
|  | A13 | 4.2 | 8.4 | 54,000 | 7.2 | 9.3 | 47,000 |
|  | A14 | 4.4 | 8.6 | 52,000 | 7.5 | 9.5 | 44,000 |
|  | A15 | 4.1 | 8.2 | 57,000 | 7.0 | 9.2 | 50,000 |
| Control Steels | B5 | 5.2 | 9.8 | 38,000 | 8.5 | 10.8 | 27,000 |
|  | B6 | 6.5 | 11.5 | 11,000 | 11.2 | 12.6 | 6,000 |
|  | B7 | 7.4 | 12.4 | 8,000 | 12.4 | 13.4 | 4,000 |
|  | B8 | 5.8 | 10.8 | 21,000 | 9.5 | 11.5 | 11,500 |

In Table 3, shaping load is expressed in terms of the pressure of the mandrel in press contact with a shaped workpiece, shaping time is expressed in terms of a period of time for providing a single shaped product, and mandrel life is expressed in terms of the number of shaped products which are rollable until the abrasion of the mandrel reaches a predetermined level.

The following facts are apparent from Tables 1-B and 3:

The deformation resistance of each of the control steels B5 and B6, of which the content of Si is out of the inventive range, is high. The deformation resistance of the control steel B7 of which the contents of Si and C are out of the inventive ranges also is high. Therefore, a great shaping load and a long shaping time were required, so that the mandrel or tool life was significantly decreased and the productivity in the manufacture of each of the inner and outer races was also significantly decreased.

On the other hand, the plastic workability of each of the inventive steels A9 to A15, of which the contents of Si and Mn were low and cause an increase in the defora reduction in the manufacturing cost of the rolling part was achieved.

The inner and outer races made of each of the inventive steels and control steels subjected to cold rolling of the 1.45 rolling ratio were assembled into the single-row and deep grooved ball bearing. This single-row and deep grooved ball bearing was subjected to through-quenching or quenching after carburizing (carbonitriding may be also applicable) and then to tempering under the conditions as shown in Tables 4-A and 4-B in order to acquire the abrasion resistance and the rolling contact fatigue resistance in the use of the single-row and deep grooved ball bearing.

Each of the inventive steels and control steels of which the content of C was below or equal to 0.45 wt. % was subjected to carburizing (carbonitriding may be also applicable) and then to quenching. On the other hand, each of the inventive steels and control steels of which the content C was above 0.45 wt. % was subjected to through-quenching or normal quenching.

The carburizing of the heat treatments of Tables 4-A and 4-B was carried out on each of the inventive steels and control steels under an atmosphere of an Rx gas plus an enriched gas at 930° C.+5° C. for about 3 hours. Then, each of the inventive steels and the control steels was subjected to oil-quenching and then to tempering at 160° C. for 2 hours.

Since some of the control steels B1 to B7 experiences numerous microcracks close to one another after cold gear rolling, microcrack-experiencing portions of those of the control steels B1 to B7 were eliminated by lathe turning. Then, those of the control steels B1 and B7 were subjected to the heat treatments of Tables 4-A and 4-B.

The surface hardness of each of the rolling bearings made of the inventive steels and the control steels of Tables 1-A and 1-B and subjected to the heat treatments of Tables 4-A and 4-B was measured. The rolling life (indicated at $L_{10}$) of the rolling bearing is tested by a tested disclosed in pates 10 to 21, "Special Steel Manual (1st edition)" edited by Electrosteelmaking Research Institute and published on May 25, 1965 by Rikohgakusha. The conditions of the rolling life test are as follows:

Radial load (Fr)=1,400 kgf
Rotation Speed N=4,000 rpm
Lubricant oil; #68, turbine oil bath The following Tables 4-A and 4-B show the results of this rolling life test.

good, so that the long-life rolling bearing was confirmed to be produced.

In addition, as apparent from Table 4-A, the rolling lives of the inventive steels A2, A3 and A8 which contain Nb or V refining the crystal grains are more increased than the rolling lives of the other inventive steels of Table 4-A which lack both Nb and V and are subjected to the heat treatments.

As above, the rolling bearings of the embodiments of the present invention have been described as the rolling part which is produced by cold gear rolling. However, the present invention is not restricted to the embodiments as described above but applicable to other rolling parts which are produced by other plastic workings.

These other rolling parts comprise, e.g., a taper-roller bearing and rolling-bearing parts, such as a roller and a ball which are produced by cold forging.

In addition, in accordance with the embodiments of the present invention as described above, only carburizing-and-quenching and oil-quenching of hardening-heat treatments were employed. However, other hardening-heat treatments, e.g. induction hardening and flame hardening, also are applicable to the hardening of the rolling part.

What is claimed is:

1. A rolling-part steel consisting essentially of: C; 0.1 to 0.7 wt. %, Si; below or equal to 0.04 wt. %, Mn; below or equal to 1.0 wt. %, Cr; 0.2 to 1.0 wt. %, S; below or equal to 0.003 wt. %, P; below or equal to 0.025 wt. %, O; below or equal to 0.0015 wt. %, the reminder Fe, and a necessary impurity.

2. The rolling-part steel as recited in claim 1 wherein the contents of C, Mn and Cr are as follows: C; 0.4 to 0.7 wt. %, Mn; 0.4 to 1.0 wt. %, and Cr; 0.4 to 1.0 wt. %.

TABLE 4-A

| | | Heat Treatment | | | Surface Hardness (HRC) | Rolling Life | |
|---|---|---|---|---|---|---|---|
| | | Quenching after carburizing | Through-quenching | Tempering | | $L_{10}$(Hr) | Ratio |
| Inventive Steels | A1 | 930° C. oil quenching | — | 160° C. × 2 Hr | 62.0 | 195 | 1.3 |
| | A2 | " | — | " | 61.5 | 309 | 2.1 |
| | A3 | " | — | " | 62.0 | 530 | 3.5 |
| | A4 | — | 860° C. oil quenching | " | 58.5 | 105 | 0.7 |
| | A5 | — | " | " | 59.0 | 123 | 0.82 |
| | A6 | — | 850° C. oil quenching | " | 61.5 | 156 | 1.0 |
| | A7 | — | " | " | 61.5 | 130 | 0.87 |
| | A8 | — | " | " | 61.8 | 237 | 1.6 |
| Control Steels | B1 | 930° C. oil quenching | — | " | 62.0 | 225 | 1.5 |
| | B2 | — | 850° C. oil quenching | " | 61.6 | 128 | 0.85 |
| | B3 | — | 840° C. oil quenching | " | 62.5 | 150 | 0.96 |
| | B4 | 840° C. oil quenching | — | " | 59.0 | 000 | 0.68 |

Note: Ratio of rolling life is computed in terms of $L_{10}$ = 156 as 1.0.

TABLE 4-B

| | | Heat Treatment | | | Surface Hardness (HRC) | Rolling Life | |
|---|---|---|---|---|---|---|---|
| | | Quenching after carburizing | Through-quenching | Tempering | | $L_{10}$(Hr) | Ratio |
| Inventive Steels | A9 | 930° C. oil quenching | — | 160° C. × 2 Hr | 62.0 | 210 | 1.35 |
| | A10 | " | — | " | 62.0 | 230 | 1.47 |
| | A11 | " | — | " | 61.5 | 270 | 1.73 |
| | A12 | " | — | " | 62.0 | 260 | 1.67 |
| | A13 | — | 850° C. oil quenching | " | 61.5 | 150 | 0.96 |
| | A14 | — | " | " | 61.5 | 190 | 1.22 |
| | A15 | — | " | " | 61.5 | 180 | 1.15 |
| Control Steels | B5 | 930° C. oil quenching | — | " | 61.5 | 220 | 1.41 |
| | B6 | " | — | " | 62.0 | 245 | 1.57 |
| | B7 | — | 840° C. oil quenching | " | 62.0 | 185 | 1.19 |
| | B8 | — | 850° C. oil quenching | " | 61.5 | 160 | 1.03 |

Note: Ratio of rolling life is computed in terms of $L_{10}$ = 156 as 1.0.

As is understood from Tables 4-A and 4-B, the rolling lives of the inventive steels A1 to A15 are generally equal to or linger than the rolling lives of the control steels B1 to B7. This fact indicates that additions of Mo, Cr and B sufficiently compensated the reduction in the hardenabilities of the inventive steels A1 to A15 due to the reduced contents of Mn and Si. Thus, even when the contents of Mn and Si were reduced, the hardenabilities of the inventive steels A1 to A15 were 3. The rolling-part steel as recited in claim 1 further including Mo; below or equal to 0.8 wt. %.

4. The rolling-part steel as recited in claim 1 further including: Mo; below or equal to 0.5 wt. %, B; 0.0005 to 0.003 wt. %, Ti; below or equal to 0.05 wt. %, and N; below or equal to 0.005 wt. %.

5. The rolling-part steel as recited in claim 3 wherein the content of Mn is below or equal to 0.25 wt. %.

6. The rolling-part steel as recited in claim 4 wherein the content of Mn is below or equal to 0.25 wt. %.

7. The rolling-part steel as recited in claim 5 wherein the content of P is below or equal to 0.01 wt. %.

8. The rolling-part steel as recited in claim 6 wherein the content of P is below or equal to 0.01 wt. %.

9. The rolling-part steel as recited in claim 1 further including no more than 0.2 wt. % of at least one element selected from the group of Nb and V.

10. A rolling part made of a rolling-part steel consisting essentially of: C; 0.1 to 0.7 wt. %, Si; below or equal to 0.04 wt. %, Mn; below or equal to 1.0 wt. %, Cr; 0.2 to 1.0 wt. %, S; below or equal to 0.003 wt. %, P; below or equal to 0.025 wt. %, O; below or equal to 0.0015 wt. %, the remainder Fe, and a necessary impurity, said steel having been plastically worked into a predetermined shape.

11. The rolling part as recited in claim 10 wherein the rolling-part steel has been plastically worked into a predetermined shape and then subjected to hardening-heat treatment.

12. A rolling bearing having an inner race, an outer race and a rolling element, comprising: at least one of the inner and outer races and the rolling element being made of a rolling-part steel consisting essentially of: C; 0.1 to 0.7 wt. %, Si; below or equal to 0.04 wt. %, Mn; below or equal to 1.0 wt. %, Cr; 0.2 to 1.0 wt. %, S; below or equal to 0.003 wt. %, P; below or equal to 0.025 wt. %, O; below or equal to 0.0015 wt. %, the remainder Fe, and a necessary impurity, which steel has been plastically worked.

13. The rolling bearing recited in claim 12 wherein the steel has been plastically worked and then subjected to hardening-heat treatment.

14. The rolling-part as claimed in claim 10 wherein the contents of C, Mn and Cr of said steel are as follows: C; 0.4 to 0.7 wt. %, Mn; 0.4 to 1.0 wt. %, and Cr; 0.4 to 1.0 wt. %.

15. The rolling-part as claimed in claim 10 wherein said steel further includes Mo; below or equal to 0.8 wt. %.

16. The rolling-part as claimed in claim 10 wherein said steel further includes: Mo; below or equal to 0.5 wt. %, B; 0.0005 to 0.003 wt. %, Ti; below or equal to 0.05 wt. %, and N; below or equal to 0.005 wt. %.

17. The rolling-part as claimed in claim 15 wherein the content of Mn of said steel is below or equal to 0.25 wt. %.

18. The rolling-part as claimed in claim 16 wherein the content of Mn of said steel is below or equal to 0.25 wt. %.

19. The rolling-part as claimed in claim 17 wherein the content of P of said steel is below or equal to 0.01 wt. %.

20. The rolling-part as claimed in claim 18 wherein the content of P of said steel is below or equal to 0.01 wt. %.

21. The rolling-part as claimed in claim 14 wherein said rolling-part steel has been plastically worked into a predetermined shape and then subjected to hardening-heat treatment.

22. The rolling-part as claimed in claim 10 wherein the rolling-part steel further includes no more than 0.2 wt. % of at least one element selected from the groups of Nb and V, which steel has been plastically worked into a predetermined shape and then subjected to hardening-heat treatment.

23. The rolling-part as claimed in claim 14 wherein the rolling-part steel further includes no more than 0.2 wt. % of at least one element selected from the groups of Nb and V, which steel has been plastically worked into a predetermined shape and then subjected to hardening-heat treatment.

24. The rolling-part as claimed in claim 15 wherein the rolling-part steel further includes no more than 0.2 wt. % of at least one element selected from the groups of Nb and V, which steel has been plastically worked into a predetermined shape and then subjected to hardening-heat treatment.

25. The rolling-part as claimed in claim 16 wherein the rolling-part steel further includes no more than 0.2 wt. % of at least one element selected from the groups of Nb and V, which steel has been plastically worked into a predetermined shape and then subjected to hardening-heat treatment.

26. The rolling-part as claimed in claim 17 wherein the rolling-part steel further includes no more than 0.2 wt. % of at least one element selected from the groups of Nb and V, which steel has been plastically worked into a predetermined shape and then subjected to hardening-heat treatment.

27. The rolling-part as claimed in claim 18 wherein the rolling-part steel further includes no more than 0.2 wt. % of at least one element selected from the groups of Nb and V, which steel has been plastically worked into a predetermined shape and then subjected to hardening-heat treatment.

28. The rolling-part as claimed in claim 19 wherein the rolling-part steel further includes no more than 0.2 wt. % of at least one element selected from the groups of Nb and V, which steel has been plastically worked into a predetermined shape and then subjected to hardening-heat treatment.

29. The rolling-part as claimed in claim 20 wherein the rolling-part steel further includes no more than 0.2 wt. % of at least one element selected from the groups of Nb and V, which steel has been plastically worked into a predetermined shape and then subjected to hardening-heat treatment.

30. The rolling bearing as claimed in claim 12 wherein the contents of C. Mn and Cr of said steel are as follows: C; 0.4 to 0.7 wt. %, Mn; 0.4 to 1.0 wt. %, and Cr; 0.4 to 1.0 wt. %.

31. The rolling bearing as claimed in claim 12 wherein said steel further includes Mo; below or equal to 0.8 wt. %.

32. The rolling bearing as claimed in claim 12 wherein said steel includes: Mo; below or equal to 0.5 wt. %, B; 0.0005 to 0.003 wt. %, Ti; below or equal to 0.05 wt. %, and N; below or equal to 0.005 wt. %.

33. The rolling bearing claimed in claim 31 wherein the content of Mn of said steel is below or equal to 0.25 wt. %.

34. The rolling bearing claimed in claim 32 wherein the content of Mn of said steel is below or equal to 0.25 wt. %.

35. The rolling bearing claimed in claim 33 wherein the content of P of said steel is below or equal to 0.01 wt. %.

36. The rolling bearing claimed in claim 34 wherein the content of P of said steel is below or equal to 0.01 wt. %.

37. The rolling bearing as claimed in claim 30 wherein the rolling steel has been plastically worked and then subjected to hardening-heat treatment.

38. The rolling bearing as claimed in claim 31 wherein the rolling steel has been plastically worked and then subjected to hardening-heat treatment.

39. The rolling bearing as claimed in claim 32 wherein the rolling steel has been plastically worked and then subjected to hardening-heat treatment.

40. The rolling bearing as claimed in claim 33 wherein the rolling steel has been plastically worked and then subjected to hardening-heat treatment.

41. The rolling bearing as claimed in claim 34 wherein the rolling steel has been plastically worked and then subjected to hardening-heat treatment.

42. The rolling bearing as claimed in claim 35 wherein the rolling steel has been plastically worked and then subjected to hardening-heat treatment.

43. The rolling bearing as claimed in claim 36 wherein the rolling steel has been plastically worked and then subjected to hardening-heat treatment.

44. The rolling bearing as claimed in claim 12 wherein the rolling-part steel includes no more than 0.2 wt. % of at least one element selected from the group of Nb and V, which steel has been plastically worked and then subjected to hardening-heat treatment.

45. The rolling bearing as claimed in claim 30 wherein the rolling-part steel includes no more than 0.2 wt. % of at least one element selected from the group of Nb and V, which steel has been plastically worked and then subjected to hardening-heat treatment.

46. The rolling bearing as claimed in claim 31 wherein the rolling-part steel includes no more than 0.2 wt. % of at least one element selected from the group of Nb and V, which steel has been plastically worked and then subjected to hardening-heat treatment.

47. The rolling bearing as claimed in claim 32 wherein the rolling-part steel includes no more than 0.2 wt. % of at least one element selected from the group of Nb and V, which steel has been plastically worked and then subjected to hardening-heat treatment.

48. The rolling bearing as claimed in claim 33 wherein the rolling-part steel includes no more than 0.2 wt. % of at least one element selected from the group of Nb and V, which steel has been plastically worked and then subjected to hardening-heat treatment.

49. The rolling bearing as claimed in claim 34 wherein the rolling-part steel includes no more than 0.2 wt. % of at least one element selected from the group of Nb and V, which steel has been plastically worked and then subjected to hardening-heat treatment.

50. The rolling bearing as claimed in claim 35 wherein the rolling-part steel includes no more than 0.2 wt. % of at least one element selected from the group of Nb and V, which steel has been plastically worked and then subjected to hardening-heat treatment.

51. The rolling bearing as claimed in claim 36 wherein the rolling-part steel includes no more than 0.2 wt. % of at least one element selected from the group of Nb and V, which steel has been plastically worked and then subjected to hardening-heat treatment.

* * * * *